United States Patent
Ji

(10) Patent No.: US 10,929,517 B2
(45) Date of Patent: Feb. 23, 2021

(54) TOUCH RESPONSE METHOD AND DEVICE

(71) Applicant: BEIJING XIAOMI MOBILE SOFTWARE CO., LTD., Beijing (CN)

(72) Inventor: Chuanshun Ji, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/413,279

(22) Filed: May 15, 2019

(65) Prior Publication Data
US 2019/0370451 A1  Dec. 5, 2019

(30) Foreign Application Priority Data

Jun. 5, 2018 (CN) .......................... 2018 1 0569942

(51) Int. Cl.
| G06F 21/32 | (2013.01) |
| G06F 9/451 | (2018.01) |
| G06F 3/041 | (2006.01) |
| G06F 3/0488 | (2013.01) |
| G06K 9/00 | (2006.01) |

(52) U.S. Cl.
CPC ............ G06F 21/32 (2013.01); G06F 3/0416 (2013.01); G06F 3/04886 (2013.01); G06F 9/451 (2018.02); G06K 9/0002 (2013.01)

(58) Field of Classification Search
CPC ........ G06F 21/32; G06F 3/0416; G06F 9/451; G06F 3/0488
See application file for complete search history.

(56) References Cited

U.S. PATENT DOCUMENTS

| 2017/0308732 A1 | 10/2017 | Wang et al. | |
| 2018/0277065 A1* | 9/2018 | Zuo | G06K 9/00006 |
| 2019/0019048 A1* | 1/2019 | Deng | G06F 3/04817 |

FOREIGN PATENT DOCUMENTS

| EP | 3182314 A1 | 6/2017 |
| EP | 3279822 A1 | 2/2018 |
| EP | 3396515 A1 | 10/2018 |

OTHER PUBLICATIONS

Extended European search report of counterpart EP application No. 19177972.7 dated Oct. 21, 2019.

* cited by examiner

*Primary Examiner* — Gerald Johnson
(74) *Attorney, Agent, or Firm* — Syncoda LLC; Feng Ma

(57) ABSTRACT

A touch response method includes recognizing a request for identity authentication in a process of operating an application; determining a fingerprint recognition area of the touch screen when identity authentication is required in the process of operating an application; displaying an identity authentication interface of the application according to the fingerprint recognition area, wherein the identity authentication interface does not display any interactive control in the fingerprint recognition area of the touch screen; receiving an input of a fingerprint from a user in the fingerprint recognition area; and completing the identity authentication according to the fingerprint corresponding to the touch operation when a touch operation on the fingerprint recognition area is detected one or more interactive controls.

20 Claims, 7 Drawing Sheets

TOUCH RESPONSE METHOD AND DEVICE

CROSS-REFERENCE TO RELATED APPLICATIONS

This application is a continuation of, and claims priority to, Chinese Patent Application No. 201810569942.X, filed on Jun. 5, 2018, the entire contents of which are incorporated herein by reference.

BACKGROUND

FOD (Fingerprint on Display) technology is an emerging fingerprint technology, which refers to hiding a fingerprint sensor under a touch screen, that is, a technology for integrating a fingerprint recognition function into the touch screen. If a terminal supports a FOD recognition function, a user can perform a fingerprint input operation directly on the touch screen, thereby improving the operation convenience of the user. Because the FOD technology has the advantage of convenience in operation, more and more manufacturers are actively researching the FOD technology and preparing to mass-produce terminals that support the FOD recognition function. Based on the FOD recognition function, the terminal can detect a touch operation of the user on the touch screen and respond to the touch operation.

SUMMARY

According to a first aspect of the embodiments of the present disclosure, there is provided a touch response method, which is applied in a terminal of a touch screen, including:
  determining a fingerprint recognition area of the touch screen when identity authentication is required in the process of operating an application;
  displaying an identity authentication interface of the application according to the fingerprint recognition area, wherein the identity authentication interface does not display any interactive control in the fingerprint recognition area of the touch screen; and
  when a touch operation on the fingerprint recognition area is detected, completing the identity authentication according to the fingerprint corresponding to the touch operation.

In the embodiment of the present disclosure, in the process of operating the application in the terminal, if the identity authentication is required, the terminal may determine whether it supports the fingerprint recognition function and a specific position of the fingerprint recognition area. Thus, when an identity authentication interface for implementing identity authentication is displayed, no interactive control is displayed in the fingerprint recognition area on the identity authentication interface. Therefore, the problem of an unintended response due to false triggering of the interactive control is avoided when a user performs a touch operation on the fingerprint recognition area to input the fingerprint.

In a possible implementation, the step of displaying the identity authentication interface of the application according to the fingerprint recognition area includes:
  acquiring interface information of the identity authentication interface; and
  when the interface information includes first information, displaying the identity authentication interface on the basis of second information in the interface information other than the first information, wherein the first information is used to display information on an interactive control in the fingerprint recognition area.

In a possible implementation, the step of displaying the identity authentication interface of the application according to the fingerprint recognition area includes:
  acquiring the interface information of the identity authentication interface, wherein the interface information includes the first information and the first information refers to information for displaying the interactive control located in the fingerprint recognition area;
  acquiring third information according to the interface information, wherein the third information refers to information for displaying, on an area on the identity authentication interface other than the fingerprint recognition area, the interactive control located in the fingerprint recognition area; and
  displaying the identity authentication interface on the basis of the third information.

In a possible implementation, the step of acquiring the third information according to the interface information includes:
  in the interface information, modifying dimension information and position information of the interactive control located in the fingerprint identification area and a target control, wherein a distance between the target control and the interactive control located in the fingerprint recognition area is less than a preset threshold; and
  taking the modified interface information as the third information.

In a possible implementation, prior to determining the fingerprint recognition area of the touch screen, further including the following steps:
  acquiring fingerprint function information of the terminal, wherein the fingerprint function information is used to indicate whether the touch screen supports a fingerprint recognition function; and
  executing the step of determining the fingerprint recognition area when it is determined that the touch screen supports the fingerprint recognition function according to the fingerprint function information.

In a possible implementation, the step of acquiring the fingerprint function information of the terminal includes:
  reading a first system global variable, wherein the value of the first system global variable is used to indicate whether the touch screen supports the fingerprint recognition function;
  determining that the touch screen supports the fingerprint recognition function when the value of the first system global variable is a first target value; and
  determining that the touch screen does not support the fingerprint recognition function when the value of the first system global variable is a second target value.

In a possible implementation, the step of acquiring the fingerprint function information of the terminal includes:
  calling a first interface, wherein a return value of the first interface is used to indicate whether the touch screen supports the fingerprint recognition function;
  determining that the touch screen supports the fingerprint recognition function when the return value of the first interface is a first target value; and
  determining that the touch screen does not support the fingerprint recognition function when the return value of the first interface is a second target value.

In a possible implementation, the step of determining the fingerprint recognition area of the touch screen includes:

reading a plurality of second system global variables to obtain coordinates of a plurality of vertices of the fingerprint recognition area, wherein the value of each second system global variable is used to indicate a horizontal coordinate and a vertical coordinate of one vertex.

In a possible implementation, the step of determining the fingerprint recognition area of the touch screen includes:
calling a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

According to a second aspect of the embodiments of the present disclosure, there is provided a touch response method, which is applied to a terminal of a touch screen and includes the following steps:
displaying an identity authentication interface of an application when identity authentication is required in the process of operating the application, wherein the identity authentication interface displays one or more interactive controls in the fingerprint recognition area of the touch screen;
acquiring only a fingerprint corresponding to a touch operation for the one or more interactive controls when the touch operation is detected; and
completing the identity authentication according to the fingerprint corresponding to the touch operation.

In the embodiment of the present disclosure, in the process of displaying, by the terminal, the identity authentication interface, if the touch operation for the interactive control on the identity authentication interface is detected, a fingerprint collection function of the fingerprint recognition area is triggered only, instead of a function corresponding to the interactive control. Therefore, the problem of an unintended response due to false triggering of the interactive control when a user performs a touch operation in the fingerprint recognition area to input the fingerprint is avoided.

In a possible implementation, the step of acquiring the fingerprint corresponding to the touch operation only includes:
intercepting a touch event sent to the application by underlying software, and sending a fingerprint collection instruction to a fingerprint module of the terminal at the same time, wherein the touch event is used to indicate that the touch operation for the interactive control is detected, and the fingerprint collection instruction is used to indicate that the fingerprint module begins to perform fingerprint collection; and
collecting, by the fingerprint module, a fingerprint corresponding to the touch operation.

In a possible implementation, the step of acquiring the fingerprint corresponding to the touch operation only when the touch operation for the interactive control is detected includes:
acquiring the fingerprint corresponding to the touch operation only when it is detected that the touch operation for the interactive control is detected and a pressure value corresponding to the touch operation is greater than a preset threshold.

According to a third aspect of the embodiments of the present disclosure, there is provided a touch response device, which is applied in a terminal of a touch screen and includes:

a determination module configured to determine a fingerprint recognition area of the touch screen when identity authentication is required in the process of operating an application;
a display module configured to display an identity authentication interface of the application according to the fingerprint recognition area, wherein the identity authentication interface does not display an interactive control in the fingerprint recognition area of the touch screen; and
a module configured to, when a touch operation on the fingerprint recognition area is detected, complete the identity authentication according to the fingerprint corresponding to the touch operation.

In a possible implementation, the display module is configured to:
acquire interface information of the identity authentication interface; and
when the interface information includes first information, display the identity authentication interface on the basis of second information in the interface information other than the first information, wherein the first information is used to display information on an interactive control in the fingerprint recognition area.

In a possible implementation, the display module is configured to:
acquire the interface information of the identity authentication interface, wherein the interface information includes the first information and the first information refers to information for displaying the interactive control located in the fingerprint recognition area;
acquire third information according to the interface information, wherein the third information refers to information for displaying, on an area on the identity authentication interface other than the fingerprint recognition area, the interactive control located in the fingerprint recognition area; and
display the identity authentication interface on the basis of the third information.

In a possible implementation, the display module is configured to:
in the interface information, modify dimension information and position information of the interactive control located in the fingerprint identification area and a target control, wherein a distance between the target control and the interactive control located in the fingerprint recognition area is less than a preset threshold; and
take the modified interface information as the third information.

In a possible implementation, the device further includes:
an acquiring module configured to acquire fingerprint function information of the terminal, wherein the fingerprint function information is used to indicate whether the touch screen supports a fingerprint recognition function; and
the determination module is configured to executing the step of determining the fingerprint recognition area when it is determined that the touch screen supports the fingerprint recognition function according to the fingerprint function information.

In a possible implementation, the acquiring module is configured to:
read a first system global variable, wherein the value of the first system global variable is used to indicate whether the touch screen supports the fingerprint recognition function;

determine that the touch screen supports the fingerprint recognition function when the value of the first system global variable is a first target value; and determine that the touch screen does not support the fingerprint recognition function when the value of the first system global variable is a second target value.

In a possible implementation, the acquiring module is configured to:

call a first interface, wherein a return value of the first interface is used to indicate whether the touch screen supports the fingerprint recognition function;

determine that the touch screen supports the fingerprint recognition function when the return value of the first interface is a first target value; and determine that the touch screen does not support the fingerprint recognition function when the return value of the first interface is a second target value.

In a possible implementation, the determination module is configured to read a plurality of second system global variables to obtain coordinates of a plurality of vertices of the fingerprint recognition area, wherein the value of each second system global variable is used to indicate a horizontal coordinate and a vertical coordinate of one vertex.

In a possible implementation, the determination module is configured to call a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

According to a fourth aspect of the embodiments of the present disclosure, there is provided a touch response device, which is applied to a terminal of a touch screen and includes:

a display module configured to display an identity authentication interface of an application when identity authentication is required in the process of operating the application, wherein the identity authentication interface displays an interactive control in the fingerprint recognition area of the touch screen;

a collecting module configured to collect a fingerprint corresponding to a touch operation for the interactive control only when the touch operation is detected; and an authentication module configured to complete the identity authentication according to the fingerprint corresponding to the touch operation.

In a possible implementation, the acquiring module is configured to:

intercept a touch event sent to the application by underlying software, and sending a fingerprint collection instruction to a fingerprint module of the terminal at the same time, wherein the touch event is used to indicate that the touch operation for the interactive control is detected, and the fingerprint collection instruction is used to indicate that the fingerprint module begins to perform fingerprint collection; and collect, by the fingerprint module, a fingerprint corresponding to the touch operation.

In a possible implementation, the collecting module is configured to collect the fingerprint corresponding to the touch operation only when it is detected that the touch operation for the interactive control is detected and a pressure value corresponding to the touch operation is greater than a preset threshold.

According to a third aspect of the embodiments of the present disclosure, there is provided a touch response device, which is applied to a terminal of a touch screen and includes:

a processor; and a memory for storing instructions executable by the processor;

wherein the processor is configured to:

determine a fingerprint recognition area of the touch screen when identity authentication is required in the process of operating an application;

display an identity authentication interface of the application according to the fingerprint recognition area, wherein the identity authentication interface does not display any interactive control in the fingerprint recognition area of the touch screen; and when a touch operation on the fingerprint recognition area is detected, complete the identity authentication according to the fingerprint corresponding to the touch operation.

According to a fourth aspect of the embodiments of the present disclosure, there is provided a touch response device, which is applied to a terminal of a touch screen and includes:

a processor; and a memory for storing instructions executable by the processor;

wherein the processor is configured to:

display an identity authentication interface of an application when identity authentication is required in the process of operating the application, wherein the identity authentication interface displays one or more interactive controls in the fingerprint recognition area of the touch screen;

collect a fingerprint corresponding to a touch operation for the one or more interactive controls only when the touch operation is detected; and complete the identity authentication according to the fingerprint corresponding to the touch operation.

According to a fifth aspect of the embodiments of the present disclosure, there is provided a computer-readable storage medium having stored therein computer programs that, when executed by a processor, causes to perform the steps in the touch response method, the method including:

determining a fingerprint recognition area of the touch screen when identity authentication is required in the process of operating an application;

displaying an identity authentication interface of the application according to the fingerprint recognition area, wherein the identity authentication interface does not display any interactive control in the fingerprint recognition area of the touch screen; and when a touch operation on the fingerprint recognition area is detected, completing the identity authentication according to the fingerprint corresponding to the touch operation.

According to a sixth aspect of the embodiments of the present disclosure, there is provided a computer-readable storage medium having stored therein computer programs that, when executed by a processor, causes to perform the steps in the touch response method, the method including:

displaying an identity authentication interface of an application when identity authentication is required in the process of operating the application, wherein the identity authentication interface displays one or more interactive controls in the fingerprint recognition area of the touch screen;

acquiring only a fingerprint corresponding to a touch operation for the one or more interactive controls when the touch operation is detected; and completing the identity authentication according to the fingerprint corresponding to the touch operation.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
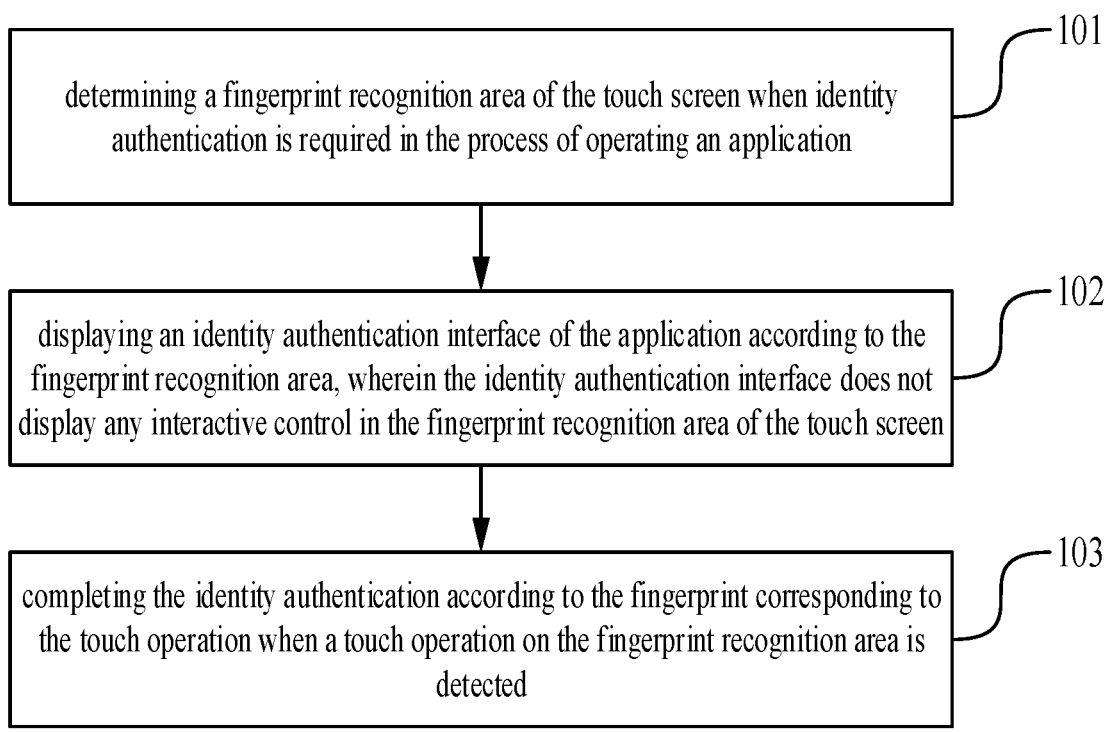
FIG. 1 is a flow chart showing a touch response method according to an exemplary embodiment.

The present disclosure will be described in further detail with reference to the accompanying drawings, to clearly present the objects, technical solutions, and advantages of the present disclosure.

Hereinafter, exemplary embodiments will be described in detail. The embodiments are shown in the accompanying drawings. In the following description when referring to the drawings, the same numerals in the different drawings denote the same or similar elements unless otherwise indicated. The embodiments described in the following exemplary embodiments are not representative of all embodiments consistent with the present disclosure. Rather, they are merely examples of devices and methods consistent with some aspects of the present disclosure as detailed in the appended claims.

The inventor of the present disclosure has recognized that, because the FOD interactive operation is performed on the touch screen, in the process of operating an application, if a UI (User Interface) of the application is drawn with interactive controls such as a button, an input box, and a check box in a fingerprint recognition area of the touch screen, these interactive controls can possibly be triggered falsely when the user performs the touch operation in the fingerprint recognition area. For example, in some third-party payment scenes, when the user needs to be authenticated, a UI interface (an identity authentication interface) for indicating the user to perform fingerprint input can be displayed.

If the fingerprint recognition area (an area corresponding to a fingerprint sensor, which is used to acquire a fingerprint inputted by the user) of the UI interface is drawn with the above interactive controls, when the user performs the touch operation on the fingerprint recognition area to input the fingerprint, these interactive controls can possibly be triggered simultaneously, resulting in unintended response behaviors. For example, the user originally hopes for inputting the fingerprint when performing the touch operation in the fingerprint identification area, but since there is a cancel button in the area, the touch operation will trigger this cancel button, resulting in the exit of the terminal from the current UI interface, so that the fingerprint input and recognition process is unable to proceed. Therefore, there is an urgent need for a touch response method to avoid the problem of unintended response caused by the touch operation.

FIG. 1 is a flow chart showing a touch response method according to an exemplary embodiment. As shown in FIG. 1, the touch response method is applied in a terminal of a touch screen. The method can include the following steps.

In step 101, upon recognition of a requirement for an identity authentication, a fingerprint recognition area of the touch screen is determined.

In step 102, an identity authentication interface of the application is displayed corresponding to the fingerprint recognition area, wherein the identity authentication interface does not display any interactive control in the fingerprint recognition area of the touch screen.

In step 103, when a touch operation on the fingerprint recognition area is detected, the portion of the touch screen corresponding to the fingerprint recognition area receives touch input corresponding to an identity authentication and compared to a biometric identification database such that, for example determining a fingerprint utilizing the touch screen, the fingerprint being received in the fingerprint recognition area displayed on the screen, such that the identity authentication can be completed according to the fingerprint corresponding to the touch operation.

In the embodiment of the present disclosure, in the process of operating the application in the terminal, in an instance wherein identity authentication is required, the terminal can determine whether it supports the fingerprint recognition function and a specific position of the fingerprint recognition area. Thus, when an identity authentication interface for implementing identity authentication is displayed, no interactive control is displayed in the fingerprint recognition area on the identity authentication interface. Therefore, the problem of an unintended response due to false triggering of the one or more interactive controls is avoided when a user performs a touch operation on the fingerprint recognition area to input the fingerprint.

In a possible implementation, the step of displaying the identity authentication interface of the application according to the fingerprint recognition area includes:

acquiring interface information of the identity authentication interface; and wherein the interface information includes a first information set, displaying the identity authentication interface on the basis of a second information set in the interface information other than the first information set, wherein the first information set refers to information for displaying one or more interactive controls in the fingerprint recognition area.

In a possible implementation, the step of displaying the identity authentication interface of the application according to the fingerprint recognition area includes:

acquiring interface information of the identity authentication interface, wherein the interface information includes a first information set and the first information set refers to information for displaying one or more interactive controls located in the fingerprint recognition area;

acquiring third information according to the interface information, wherein the third information refers to information for displaying, on an area on the identity authentication interface other than the fingerprint recognition area, the one or more interactive controls originally located in the fingerprint recognition area; and displaying the identity authentication interface on the basis of the third information.

In a possible implementation, the step of acquiring the third information according to the interface information includes:

in the interface information, modifying dimension information and position information of the one or more interactive controls located in the fingerprint identification area and one or more target controls, wherein a distance between the one or more target controls and the one or more interactive controls located in the fingerprint recognition area is less than a preset threshold; and taking the modified interface information as the third information.

In a possible implementation, prior to determining the fingerprint recognition area of the touch screen, further including the following steps:

acquiring fingerprint function information of the terminal, wherein the fingerprint function information is used to indicate whether the touch screen supports a fingerprint recognition function; and executing the step of determining the fingerprint recognition area when it is determined that the touch screen supports the fingerprint recognition function according to the fingerprint function information.

In a possible implementation, the step of acquiring the fingerprint function information of the terminal includes:

reading a first system global variable, wherein a value of the first system global variable is used to indicate whether the touch screen supports the fingerprint recognition function;

determining that the touch screen supports the fingerprint recognition function when the value of the first system global variable is a first target value; and determining that the touch screen does not support the fingerprint recognition function when the value of the first system global variable is a second target value.

In a possible implementation, the step of acquiring the fingerprint function information of the terminal includes:

calling a first interface, wherein a return value of the first interface is used to indicate whether the touch screen supports the fingerprint recognition function;

determining that the touch screen supports the fingerprint recognition function when the return value of the first interface is a first target value; and determining that the touch screen does not support the fingerprint recognition function when the return value of the first interface is a second target value.

In a possible implementation, the step of determining the fingerprint recognition area of the touch screen includes:

reading a plurality of second system global variables to obtain coordinates of a plurality of vertices of the fingerprint recognition area, wherein the value of each second system global variable is used to indicate a horizontal coordinate and a vertical coordinate of one vertex.

In a possible implementation, the step of determining the fingerprint recognition area of the touch screen includes:

calling a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

All of the selectable technique solutions described above, can be selected in any combination to form alternative embodiments of the present disclosure, and will not be described again herein.

Figure 2:
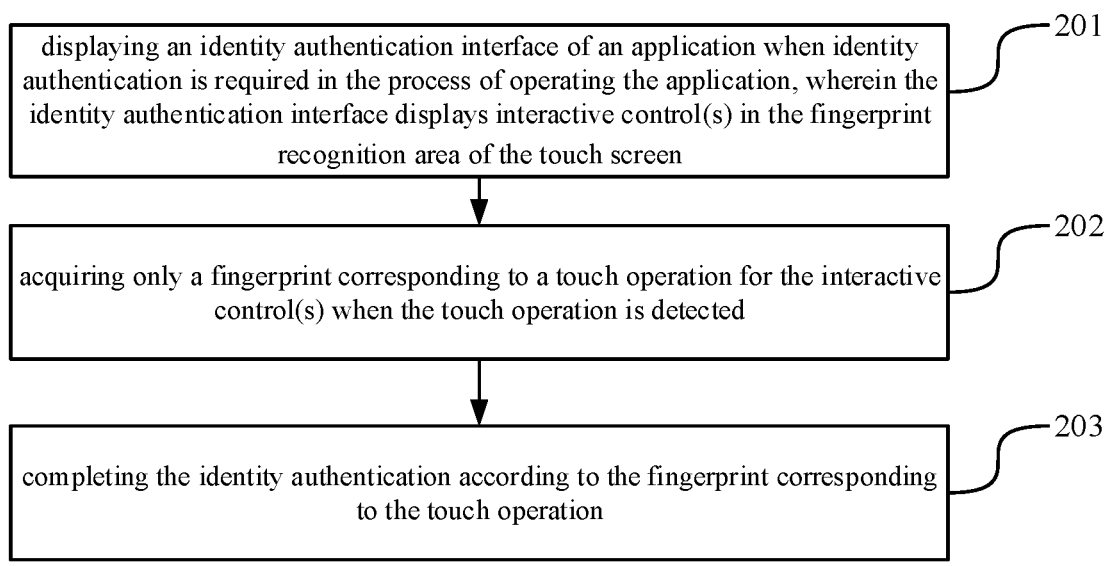
FIG. 2 is a flow chart showing a touch response method according to an exemplary embodiment.

FIG. 2 is a flow chart showing a touch response method according to an exemplary embodiment. As shown in FIG. 2, the touch response method is applied to a terminal of a touch screen. The method includes the following steps.

In step 201, an identity authentication interface of an application is displayed when identity authentication is required in the process of operating the application, wherein the identity authentication interface displays one or more interactive controls in the fingerprint recognition area of the touch screen.

In step 202, only a fingerprint corresponding to a touch operation for the one or more interactive controls is acquired when the touch operation is detected.

In step 203, the identity authentication is completed according to the fingerprint corresponding to the touch operation.

In the embodiment of the present disclosure, in the process of displaying, by the terminal, the identity authentication interface, if the touch operation for the one or more interactive controls on the identity authentication interface is detected, instead of a function corresponding to the interactive control, only a fingerprint collection function of the fingerprint recognition area is triggered. Therefore, the problem of an unintended response due to false triggering of the interactive control when a user performs a touch operation in the fingerprint recognition area to input the fingerprint is avoided.

In a possible implementation, the step of acquiring the fingerprint corresponding to the touch operation only includes:

intercepting a touch event sent to the application by underlying software, and sending a fingerprint collection instruction to a fingerprint module of the terminal at the same time, wherein the touch event is used to indicate that the touch operation for the one or more interactive controls is detected, and the fingerprint collection instruction is used to indicate that the fingerprint module begins to perform fingerprint collection; and collecting, by the fingerprint module, a fingerprint corresponding to the touch operation.

It is noted that the various device components, units, blocks, or portions may have modular configurations, or are composed of discrete components, but nonetheless may be referred to as "modules" in general. In other words, the "modules" or "units" referred to herein may or may not be in modular forms.

In a possible implementation, the step of acquiring the fingerprint corresponding to the touch operation only when the touch operation for the one or more interactive controls is detected includes:

acquiring the fingerprint corresponding to the touch operation only when it is detected that the touch operation for the one or more interactive controls is detected and a pressure value corresponding to the touch operation is greater than a preset threshold.

All of the selectable technique solutions described above, can be selected in any combination to form alternative embodiments of the present disclosure, and will not be described again herein.

Figure 3:
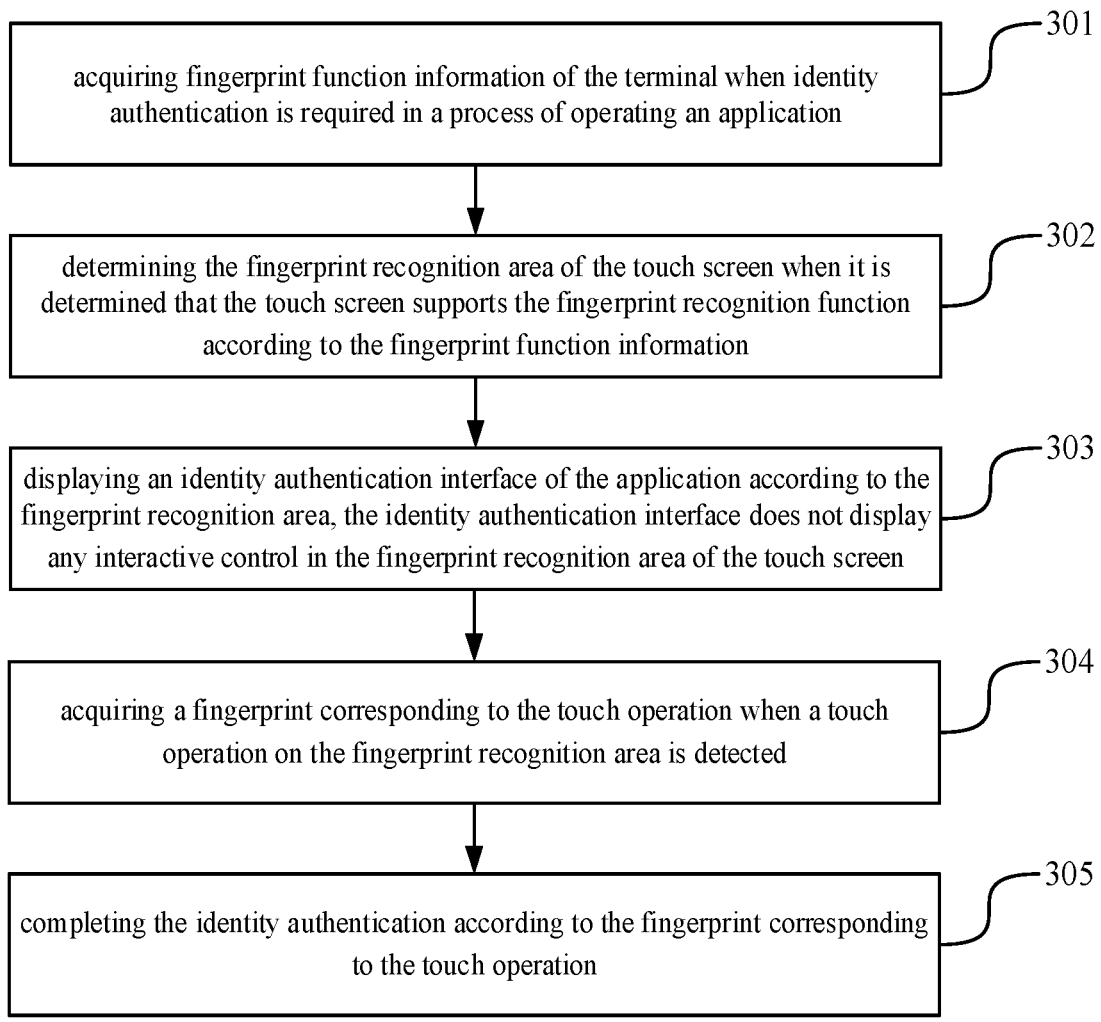
FIG. 3 is a flow chart showing a touch response method according to an exemplary embodiment.

FIG. 3 is a flowchart of a touch response method shown according to an exemplary embodiment. As shown in FIG. 3, the touch response method is applied to a terminal having a touch screen and includes the following steps 301-305.

In step 301, fingerprint function information of the terminal is acquired when identity authentication is required in a process of operating an application, wherein the fingerprint function information is used to indicate whether the touch screen of the terminal supports a fingerprint recognition function.

The fingerprint recognition function refers to a FOD (Fingerprint on Display) recognition function, that is, a function of recognizing a fingerprint inputted by a user on the touch screen.

In the embodiment of the present disclosure, the terminal can in some instances encounter a situation in which the user needs to be authenticated in the process of operating the application. For example, when the application is a third-party payment application, if the user performs a payment confirmation operation, e.g., a triggering operation for a payment confirmation button, in the process of operating the application, the terminal needs to authenticate the user, and the payment can be completed after the identity authentication is passed. Fingerprint recognition is a common authentication method in identity authentication. The premise of the fingerprint recognition lies in that the touch screen of the terminal supports the fingerprint recognition function, that is, the terminal supports the FOD recognition function. If the touch screen supports the fingerprint recognition function, an identity authentication interface of the application is displayed when the terminal needs to authenticate the user in the process of operating the application, to prompt the user to perform fingerprint input and further recognize the fingerprint inputted by the user, thereby completing fingerprint recognition.

In a possible implementation manner, whether the terminal supports the fingerprint recognition function can be marked by use of a system global variable. The system global variable is generally represented by a prop attribute in a terminal system, which different modules of the terminal and different levels of software can read. Whether the terminal supports the fingerprint recognition function can be determined by reading the system global variable. Specifically, the process of acquiring, by the terminal, the fingerprint function information includes: reading a first system global variable, wherein a value of the first system global variable is used to indicate whether the terminal supports the fingerprint recognition function; determining that the touch screen supports the fingerprint recognition function when the value of the first system global variable is a first target value; and determining that the touch screen does not support the fingerprint recognition function when the value of the first system global variable is a second target value.

For example, the first system global variable can be persist.fod.present. The first target value and the second target value can be logical values True and False, respectively. When persist.fod.present=True indicates that the terminal supports the FOD recognition function, the terminal can assign a value to the first system global variable during a hardware initialization phase. If the fingerprint module for FOD recognition is successfully initialized, the terminal can assign a value of "True" to the first system global variable, otherwise the terminal may leave the first system global variable undefined, or assign a value of "False" to the first system global variable. The terminal can then define whether the FOD exists, that is, whether the terminal supports the FOD recognition function, by using one system global variable. This thus represents an effective method of acquiring fingerprint function information. Further, the terminal can then support the FOD recognition function, such that the FOD recognition function can be performed quickly by reading the value of the system global variable when the terminal needs to perform identity authentication.

In yet another possible implementation, the terminal can provide an API (Application Programming Interface) at a system level. The terminal can call this interface to confirm whether the terminal supports the fingerprint recognition function in the process of operating an application. Specifically, the step of acquiring, by the terminal, the fingerprint function information includes: calling a first interface, wherein a return value of the first interface is used to indicate whether the terminal supports the fingerprint recognition function; determining that the touch screen supports the fingerprint recognition function when the return value of the first interface is a first target value; and determining that the touch screen does not support the fingerprint recognition function when the return value of the first interface is a second target value.

For example, the first interface can be an IsFodPresent( ) interface, and the return value of the first interface can be a Boolean variable (BOOL). This manner is another effective way to obtain the fingerprint function information, so that whether the terminal supports the FOD recognition function can be learnt quickly by calling the interface when the terminal needs to perform identity authentication.

In step 302, the fingerprint recognition area of the touch screen is determined when it is determined that the touch screen supports the fingerprint recognition function according to the fingerprint function information.

In the embodiment of the present disclosure, when it is determined that the terminal supports the fingerprint recognition function, the terminal can further determine the fingerprint recognition area of the touch screen, that is, an area for FOD recognition. The user can input a fingerprint in the fingerprint recognition area, and trigger the terminal to recognize the fingerprint of the user, i.e., confirm whether the currently input fingerprint matches a stored fingerprint.

For the case where whether the terminal supports the fingerprint recognition function is determined by reading the first system global variable in step 301, in a possible implementation manner, the step of determining, by the terminal, the fingerprint recognition area of the touch screen includes: reading a plurality of second system global variables to obtain coordinates, including horizontal coordinates and vertical coordinates, of a plurality of vertices in the fingerprint recognition area. The value of each second system global variable is used to indicate the horizontal coordinate and the vertical coordinate of one vertex.

The fingerprint recognition area can be designed by a terminal developer based on a position of a fingerprint sensor hidden under the touch screen. The fingerprint sensor is used for the terminal to acquire a fingerprint of the user. The fingerprint sensor can be an optical fingerprint sensor or an ultrasonic fingerprint sensor, wherein the position of the fingerprint sensor corresponds to the fingerprint recognition area. The fingerprint sensor is generally in a rectangular shape. In consideration that the fingerprint sensor is not necessarily placed horizontally or vertically under the touch screen, the terminal can determine the position of the fingerprint sensor by using the positions of the four vertices, that is, the positions of the four vertices are used to determine the fingerprint recognition area of the touch screen. For each vertex, the terminal can use the coordinates (including the horizontal coordinate and the vertical coordinate) of the vertex to represent the position of the vertex. Specifically, the terminal can define the coordinates of four vertices in the fingerprint recognition area by using the plurality of second system global variables (prop). The value of each system global variable is a horizontal coordinate or a vertical coordinate of one vertex.

Figure 4:
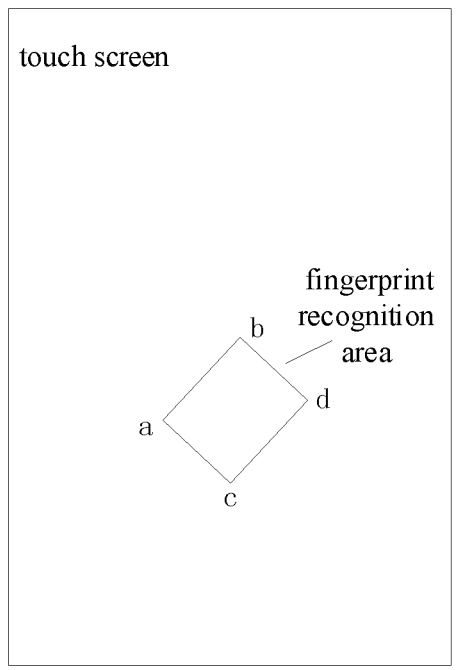
FIG. 4 is a flow chart showing a touch response method according to an exemplary embodiment.

FIG. 4 provides a schematic diagram of the fingerprint recognition area. As shown in FIG. 4, the upper left vertex of the fingerprint recognition area is a point a, the upper right vertex is a point b, the lower left vertex is a point c, and the lower right vertex is a point d. The terminal can define the coordinates of the above four vertices by using eight second system global variables, such as persist.fod.a.x, persist.fod.a.y, persist.fod.b.x, persist.fod.b.y, persist.fod.c.x, persist.fod.c.y, persist.fod.d.x, and persist.fod.d.y.

Persist.fod.a.x represents the horizontal coordinate of the upper left vertex, and persist.fod.a.y represents the vertical coordinate of the upper left vertex; persist.fod.b.x represents the horizontal coordinate of the upper right vertex, and persist.fod.b.y represents the vertical coordinate of the upper right vertex; persist.fod.c.x represents the horizontal coordinate of the lower left vertex, and persist.fod.c.y represents the vertical coordinate of the lower left vertex; persist.fod.d.x represents the horizontal coordinate of the lower right vertex, and persist.fod.d.y represents the vertical coordinate of the lower right vertex. By means of the above eight second system global variables, the terminal can accurately determine the specific position of the fingerprint recognition area on the touch screen. The terminal can assign values to the above eight second system global variables during the system initialization phase, so that the values of the eight second system global variables are the horizontal coordinates and the vertical coordinates of the respective vertices.

Whether the terminal supports the FOD recognition function and the specific position of the fingerprint recognition area are determined in a manner of reading the system global variables. When the value of the first system global variable is a first target value, it is considered that the terminal supports the FOD recognition function. After the specific position of the fingerprint recognition area is determined by the above eight second system global variables, one or more interactive controls can be prevented from being displayed in this area.

It should be noted that, the embodiment of the present disclosure is described by taking the case where the terminal reads the first system global variable first to determine that the terminal supports the FOD recognition function, and then reads the second system global variables to determine the fingerprint recognition area as an example. In some embodiments, the terminal can also provide the first system global variable and the second system global variables in a structural body form, so that the terminal can obtain the values of the first system global variable and the second system global variables at the same time by acquiring the structural body.

For the case where whether the terminal supports the fingerprint recognition function is determined by calling the first interface in step 301, in a possible implementation manner, the step of determining, by the terminal, the fingerprint recognition area of the touch screen includes: calling a second interface to obtain coordinates of a plurality of vertices in the fingerprint recognition area, wherein a return value of the second interface is used to indicate horizontal coordinates and vertical coordinates of the plurality of vertices in the fingerprint recognition area. By means of this manner, the specific position of the fingerprint recognition area can be determined by calling the second interface according to the return value of the second interface.

The second interface can be FodPositionInTP ( ). The second interface can be a structural body including eight variables for describing the coordinates of respective vertices in the fingerprint recognition area. Underlying software of the terminal is responsible for implementing the functions of the first interface and the second interface, such as a function of determining whether the terminal supports fingerprint recognition and determines the fingerprint recognition area.

Whether the terminal supports the FOD recognition function and the specific position of the fingerprint recognition area are determined in a manner of reading the system global variables or calling the interfaces, so that the terminal can correctly process an operation scene where the FOD recognition exists in the process of operating the application. With respect to the above two manners, a developer needs to perform active adapting when developing the application. Therefore, in the case of authenticating the user in the process of operating the application, the terminal can learn whether it supports the FOD recognition function and the specific position of the fingerprint authentication area is determined by reading the system global variables or by calling the interfaces, thereby performing corresponding processing.

It should be noted that, the above steps 301 to 302 are of a possible implementation manner for determining the fingerprint identification area of the touch screen when identity authentication is required in the process of operating the application. By determining whether the terminal supports the FOD recognition function first and then determining the fingerprint recognition area when the terminal supports the FOD recognition function, it is possible for the terminal to prevent the one or more interactive controls from being displayed in the fingerprint recognition area according to the position of the fingerprint recognition area.

In step 303, an identity authentication interface of the application is displayed according to the fingerprint recognition area. The identity authentication interface does not display any interactive control in the fingerprint recognition area of the touch screen.

In the embodiment of the present disclosure, in order to avoid the problem of unintended response due to the presence of the one or more interactive controls in the fingerprint recognition area, the terminal cannot display any interactive control such as a button, an input box, or a check box in the fingerprint recognition area. In a possible implementation manner, the process of displaying, by the terminal, the identity authentication interface of the application includes: acquiring interface information of the identity authentication interface; and wherein the interface information includes a first information set, displaying the identity authentication interface on the basis of a second information set in the interface information other than the first information set, wherein the first information set refers to information for displaying one or more interactive controls in the fingerprint recognition area.

The interface information includes layout information of the identity authentication interface and interface contents displayed in respective areas of the identity authentication interface. The interface contents can include an interface background, text(s), picture(s), interactive control(s), and the like. The interface information can further include prompt information for prompting the user to input a fingerprint, such as "please authenticate the fingerprint". When the interface information of the identity authentication interface includes a first information set, the terminal can display one or more interactive controls in the fingerprint recognition area according to the first information set. For the area other than the fingerprint recognition area, the terminal can display these areas normally according to the second information set in the interface information, so as to ensure that the problem of false triggering of the one or more interactive controls from the user due to the display of the one or more interactive controls is avoided when the user is prompted for fingerprint input.

In a possible implementation manner, the process of displaying, by the terminal, the identity authentication interface of the application includes: acquiring interface information of the identity authentication interface, wherein the interface information includes a first information set; acquiring third information according to the interface information, wherein the third information refers to information for displaying, on an area on the identity authentication interface other than the fingerprint recognition area, the one or more interactive controls originally located in the fingerprint recognition area; and displaying the identity authentication interface on the basis of the third information. When the interface information of the identity authentication interface includes the first information set, the terminal can modify the interface information to obtain the third information for displaying the one or more interactive controls in the area other than the fingerprint recognition area, and further can, in the case of drawing based on the third information, ensure that no interactive control is displayed in the fingerprint recognition area on the identity authentication interface displayed after the drawing is completed. In this manner, the one or more interactive controls originally displayed in the fingerprint recognition area can be moved to other areas for display, thereby ensuring that an unintended response due to false triggering of the one or more interactive controls is avoided when the user inputs the fingerprint in the fingerprint identification area.

The step of acquiring the third information according to the interface information includes: in the interface information, modifying dimension information and position information of the one or more interactive controls and one or more target controls located in the fingerprint identification area, wherein a distance between the one or more target controls and the one or more interactive controls located in the fingerprint identification area is less than a preset threshold; and taking the modified interface information as the third information. The terminal obtains the third information for displaying the one or more interactive controls in the area other than the fingerprint recognition area by modifying the dimensions and positions of the one or more interactive controls in the fingerprint recognition area and controls in the vicinity thereof, such that no interactive control is displayed in the fingerprint recognition area on the identity authentication interface displayed on the basis of the third information. Therefore, the one or more interactive controls in the fingerprint recognition area can be prevented from being falsely triggered when the user inputs the fingerprint in the fingerprint recognition area.

In step 304, when a touch operation on the fingerprint recognition area is detected, a fingerprint corresponding to the touch operation is acquired.

In the embodiment of the present disclosure, in the process of displaying, by the terminal, the identity authentication interface, the user can perform the touch operation on the fingerprint recognition area in the identity authentication interface. The terminal can acquire the fingerprint corresponding to the touch operation when detecting the touch operation. For example, the terminal can detect the touch operation on the fingerprint recognition area by using a fingerprint sensor, and acquire the fingerprint corresponding to the touch operation by using the fingerprint sensor corresponding to the fingerprint recognition area.

In a possible implementation manner, the fingerprint sensor corresponding to the fingerprint recognition area can be an optical fingerprint sensor. Correspondingly, the process of acquiring, by the terminal, the fingerprint corresponding to the touch operation can include: detecting, by a terminal, a finger of a user through the optical fingerprint sensor corresponding to the fingerprint recognition area to obtain a reflected optical signal, converting the optical signal into an electric signal, and then converting the electric signal to the fingerprint of the user. The reflected optical signal is an optical signal reflected by a texture on the surface of the fingerprint of the user.

Of course, the fingerprint sensor can also be an ultrasonic fingerprint sensor. Correspondingly, in a possible implementation manner, the process of acquiring, by the terminal, the fingerprint corresponding to the touch operation can include: transmitting, by the terminal, an ultrasonic signal through the ultrasonic fingerprint sensor corresponding to the fingerprint recognition area, receiving an ultrasonic signal reflected by the finger of the user, and then acquiring the fingerprint of the user according to the transmitted ultrasonic signal and the received reflected ultrasonic signal.

The terminal can acquire the fingerprint corresponding to the touch operation in different manners according to different types of the fingerprint sensors, and then complete the identity authentication through the subsequent step 305.

In step 305, the identity authentication is completed according to the fingerprint corresponding to the touch operation.

In the embodiment of the present disclosure, after acquiring the fingerprint corresponding to the touch operation, the terminal can recognize the fingerprint, i.e., determine whether the currently acquired fingerprint matches a pre-stored fingerprint. The fingerprint pre-stored by the terminal can be a fingerprint inputted by the user on the terminal in advance. For example, in the case of using the fingerprint function for the first time, the user can perform a touch operation on the fingerprint recognition area of the terminal according to a fingerprint input guidance provided by the terminal. The terminal can acquire the fingerprint corresponding to the touch operation, and store the fingerprint, thereby completing the fingerprint input.

In a possible implementation manner, the step of completing, by the terminal, the identity authentication according to the fingerprint corresponding to the touch operation includes: comparing the fingerprint corresponding to the touch operation with the pre-stored fingerprint; when the fingerprint corresponding to the touch operation matches the pre-stored fingerprint, determining that the identity authentication is passed; when the fingerprint corresponding to the touch operation does not match the pre-stored fingerprint, determining that the identity authentication is not passed.

The identity authentication can be completed according to the pre-stored fingerprint. By taking the identity authentication in a payment scene as an example, the terminal can complete a payment operation when the identity authentication is passed. When the identity authentication is not passed, a payment failure message will be displayed, and the user can also be prompted to re-input the fingerprint at the same time.

It should be noted that the steps 304 and 305 are of a possible implementation manner for completing identity authentication according to the fingerprint corresponding to the touch operation when the touch operation on the fingerprint recognition area is detected. The embodiment of the present disclosure is described by taking the case where a terminal acquires the fingerprint and recognizes the same when detecting the touch operation on the fingerprint recognition area as an example. In some embodiments, the terminal can also acquire the fingerprint and recognize the same when the touch operation on the fingerprint recognition area is detected and the pressure value corresponding to the touch operation is greater than a preset threshold. The pressure value corresponding to the touch operation can be detected by a pressure sensor of the touch screen. The pressure sensor can be distributed under the entire screen of the touch screen, or can be disposed only under the fingerprint recognition area, as long as the pressure of the touch operation occurring in the fingerprint recognition area can be detected, which will not be limited in the embodiment of the present disclosure.

In the embodiment of the present disclosure, in the process of operating the application in the terminal, if the identity authentication is required, the terminal can determine whether it supports the fingerprint recognition function and a specific position of the fingerprint recognition area. Thus, when an identity authentication interface for implementing identity authentication is displayed, no interactive control is displayed in the fingerprint recognition area on the identity authentication interface. Therefore, the problem of an unintended response due to false triggering of the one or more interactive controls is avoided when a user performs a touch operation on the fingerprint recognition area to input the fingerprint.

Figure 5:
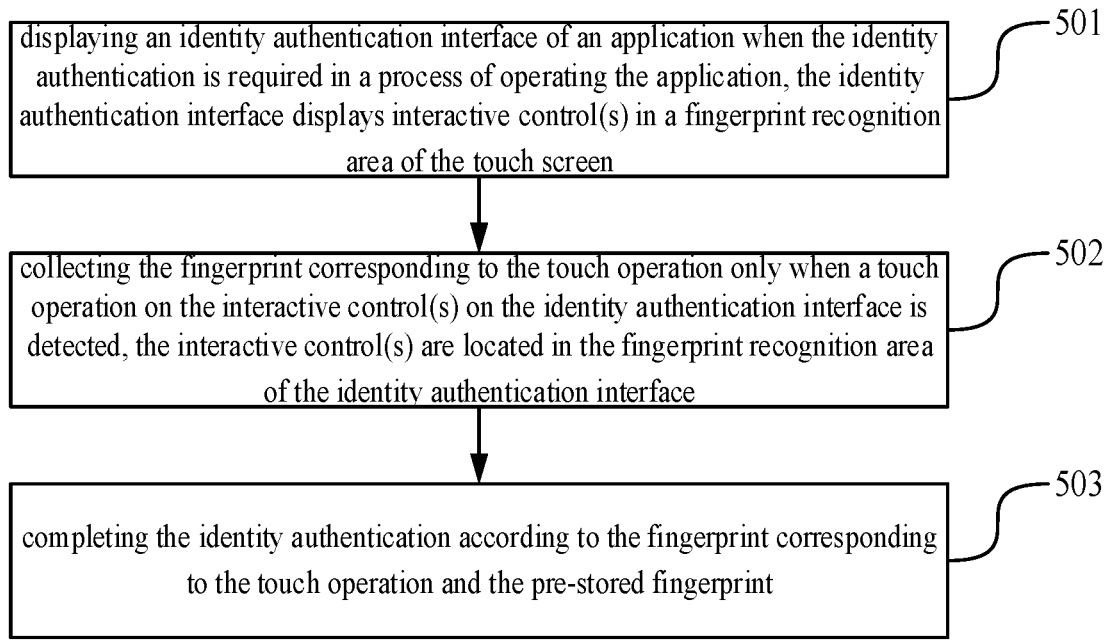
FIG. 5 is a schematic diagram of a fingerprint identification area according to an exemplary embodiment.

FIG. 5 is a flowchart of a touch response method shown according to an exemplary embodiment. As shown in FIG. 5, the touch response method is applied to a terminal of a touch screen and includes the following steps 501-503.

In step 501, an identity authentication interface of an application is displayed when the identity authentication is required in a process of operating the application. The identity authentication interface displays one or more interactive controls in a fingerprint recognition area of the touch screen.

In the embodiment of the present disclosure, the terminal can possibly encounter a scene in which the user needs to be authenticated in the process of operating the application. For example, when the application is a third-party payment application, if the user performs a payment confirmation operation, e.g., a triggering operation for a payment confirmation button, in the process of operating the application, the terminal needs to authenticate the user, and the payment can be completed after the identity authentication is passed. Fingerprint recognition is a common authentication method in identity authentication. The premise of fingerprint recognition lies in that the touch screen supports the fingerprint recognition function, that is, the terminal supports the FOD recognition function. If the touch screen supports the fingerprint recognition function, the identity authentication interface of the application is displayed when the terminal needs to authenticate the user in the process of operating the application.

In a possible implementation manner, the process of displaying, by the terminal, the identity authentication interface includes: acquiring interface information of the identity authentication interface; and displaying the identity authentication interface on the basis of the interface information. The interface information includes layout information of the identity authentication interface and interface contents displayed in respective areas of the identity authentication interface. The interface contents can include an interface background, a text, a picture, an interactive control, and the like. The interface information can further include prompt information for prompting the user to input a fingerprint, such as "please authenticate the fingerprint". When the interface information includes the one or more interactive controls in the fingerprint recognition area, the terminal can draw the corresponding one or more interactive controls in the fingerprint recognition area of the identity authentication interface in the course of displaying the identity authentication interface according to the interface information, such that the one or more interactive controls are included in the identity authentication interface displayed after the drawing is completed by the terminal.

The interface is displayed on the basis of the interface information of the identity authentication interface, thereby providing a manner for displaying the identity authentication interface. Therefore, the user can perform fingerprint input according to the prompt from the identity recognition interface. Then, the terminal recognizes the fingerprint inputted by the user, thereby completing the fingerprint authentication.

In step 502, when a touch operation on the one or more interactive controls on the identity authentication interface is detected, the fingerprint corresponding to the touch operation is collected only. The one or more interactive controls are located in the fingerprint recognition area of the identity authentication interface.

The one or more interactive controls can include a button, an input box, a check box, or the like.

In the embodiment of the present disclosure, in the process of displaying, by the terminal, the identity authentication interface, the user can perform the touch operation on the fingerprint recognition area in the identity authentication interface. Since the one or more interactive controls are displayed in the fingerprint recognition area, the user can possibly touch the interactive control(s), such that the terminal detects the touch operation for the interactive control(s). For example, the terminal can detect the touch operation through a fingerprint sensor in the fingerprint recognition area.

Since the user can perform a corresponding operation to trigger the terminal to display the identity authentication interface usually when the identity authentication is required to be performed by fingerprint recognition, the terminal can consider that the touch operation performed by the user is to input a fingerprint. In order to prevent the terminal from performing an unintended response behavior, the terminal can only trigger the fingerprint collection process, rather than the function corresponding to the interactive control(s), i.e., the function that can be implemented by the interactive control(s). For example, if the interactive control is a cancel button, the function corresponding to the cancel button can be to exit from the current identity authentication interface.

In a possible implementation manner, the step of collecting, by the terminal, the fingerprint corresponding the touch operation only includes: intercepting a touch event sent to the application by underlying software, and sending a fingerprint collection instruction to a fingerprint module of the terminal at the same time, wherein the touch event is used to indicate that the touch operation for the one or more interactive controls is detected, and the fingerprint collection instruction is used to indicate that the fingerprint module begins to perform fingerprint collection; an collecting, by the fingerprint module, a fingerprint corresponding to the touch operation.

The underlying software can be underlying driver software corresponding to the fingerprint sensor. The fingerprint module can be a fingerprint sensor. The process that the underlying software of the terminal sends a fingerprint collection instruction to the fingerprint module can be represented by a variable. The value of the variable is a logical value, for example, FD (Finger Detect)=True, which is used to indicate that a touch event for the fingerprint recognition area is detected and indicate that the fingerprint module can begin to collect the fingerprint of the user.

In a possible implementation manner, the fingerprint module for collecting the fingerprint can be an optical fingerprint sensor. Correspondingly, the process of collecting, by the terminal, the fingerprint corresponding to the touch operation through the fingerprint module can include: detecting, by the terminal, a finger of the user through the optical fingerprint sensor corresponding to the fingerprint recognition area to obtain a reflected optical signal, converting the optical signal into an electric signal, and then converting the electric signal to the fingerprint of the user. The reflected optical signal is an optical signal reflected by a texture on the surface of the fingerprint of the finger of the user.

Of course, the fingerprint sensor can also be an ultrasonic fingerprint sensor. Correspondingly, in a possible implementation manner, the process of acquiring, by the terminal, the fingerprint corresponding to the touch operation through the fingerprint module can include: transmitting, by the terminal, an ultrasonic signal through the ultrasonic fingerprint sensor corresponding to the fingerprint recognition area, receiving an ultrasonic signal reflected by the finger of the user, and then acquiring the fingerprint of the user according to the transmitted ultrasonic signal and the received reflected ultrasonic signal.

It should be noted that the embodiment of the present disclosure is described by taking the case where the terminal detects the touch operation on the fingerprint recognition area and collects the fingerprint as an example. In some embodiments, the terminal can also collect the fingerprint corresponding to the touch operation when the touch operation for the one or more interactive controls on the fingerprint recognition area is detected and the pressure value corresponding to the touch operation is greater than a preset threshold. The pressure value corresponding to the touch operation can be detected by a pressure sensor. The pressure sensor can be distributed under the entire screen of the touch screen, or can be disposed only under the fingerprint recognition area, as long as the pressure of the touch operation occurring in the fingerprint recognition area can be detected, which will not be limited in the embodiment of the present disclosure.

In step 503, the identity authentication is completed according to the fingerprint corresponding to the touch operation and the pre-stored fingerprint.

The fingerprint pre-stored by the terminal can be a fingerprint inputted by the user on the terminal in advance. For example, in the case of using the fingerprint function for the first time, the user can perform the touch operation on the fingerprint identification area of the terminal according to a fingerprint input guidance provided by the terminal. The terminal can acquire the fingerprint corresponding to the touch operation, and store the fingerprint, thereby completing the fingerprint input.

In the embodiment of the present disclosure, after acquiring the fingerprint corresponding to the touch operation, the terminal can recognize the fingerprint, i.e., determine whether the currently acquired fingerprint matches a pre-stored fingerprint. In a possible implementation manner, the process of completing the identity authentication by the terminal includes: comparing the fingerprint corresponding to the touch operation with the pre-stored fingerprint; when the fingerprint corresponding to the touch operation matches the pre-stored fingerprint, determining that the identity authentication is passed; when the fingerprint corresponding to the touch operation does not match the pre-stored fingerprint, determining that the identity authentication is not passed. By taking the identity authentication in a payment scene as an example, the terminal can complete the payment operation when the identity authentication is passed. When the identity authentication is not passed, a payment failure message will be displayed, and the user can also be prompted to re-input the fingerprint.

It should be noted that the step 503 is a possible implementation manner in which the terminal completes identity verification according to the fingerprint corresponding to the touch operation. By comparing with the pre-stored fingerprint, it is determined whether the identity recognition is passed according to the matching condition between the currently acquired fingerprint and the pre-stored fingerprint, thereby providing an effective way for performing identity authentication.

In the embodiment of the present disclosure, in the process of displaying, by the terminal, the identity authentication interface, if the touch operation for the one or more interactive controls on the identity authentication interface is detected, instead of a function corresponding to the interactive control, only a fingerprint collection function of the fingerprint recognition area is triggered. Therefore, the problem of an unintended response due to false triggering of the interactive control(s) when a user performs a touch operation in the fingerprint recognition area to input the fingerprint is avoided.

Figure 6:
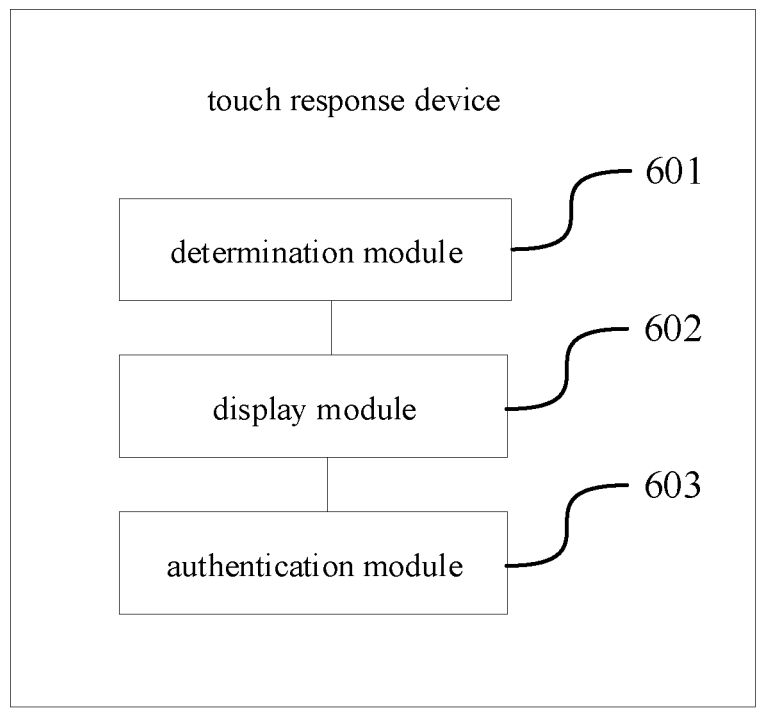
FIG. 6 is a block diagram of a touch response device according to an exemplary embodiment.

FIG. 6 is a block diagram of a touch response device according to an exemplary embodiment. Referring to FIG. 6, the device includes a determination module 601, a display module 602 and an authentication module 603.

The determination module 601 is configured to determine a fingerprint recognition area of the touch screen when identity authentication is required in the process of operating an application.

The display module 602 is configured to display an identity authentication interface of the application according to the fingerprint recognition area, wherein the identity authentication interface does not display any interactive control in the fingerprint recognition area of the touch screen.

The authentication module is configured to, when a touch operation on the fingerprint recognition area is detected, complete the identity authentication according to the fingerprint corresponding to the touch operation.

In a possible implementation, the display module 602 is configured to:
acquire interface information of the identity authentication interface; and
when the interface information comprises a first information set, display the identity authentication interface on the basis of a second information set in the interface information other than the first information set, wherein the first information set refers to information for displaying one or more interactive controls in the fingerprint recognition area.

In a possible implementation, the display module 602 is configured to:
  acquire interface information of the identity authentication interface, wherein the interface information comprises a first information set and the first information set refers to information for displaying the one or more interactive controls located in the fingerprint recognition area;
  acquire third information according to the interface information, wherein the third information refers to information for displaying, on an area on the identity authentication interface other than the fingerprint recognition area, the one or more interactive controls originally located in the fingerprint recognition area; and
  display the identity authentication interface on the basis of the third information.

In a possible implementation, the display module 602 is configured to:
  in the interface information, modify dimension information and position information of the one or more interactive controls located in the fingerprint identification area and one or more target controls, wherein a distance between the one or more target controls and the one or more interactive controls located in the fingerprint recognition area is less than a preset threshold; and
  take the modified interface information as the third information.

Figure 7:
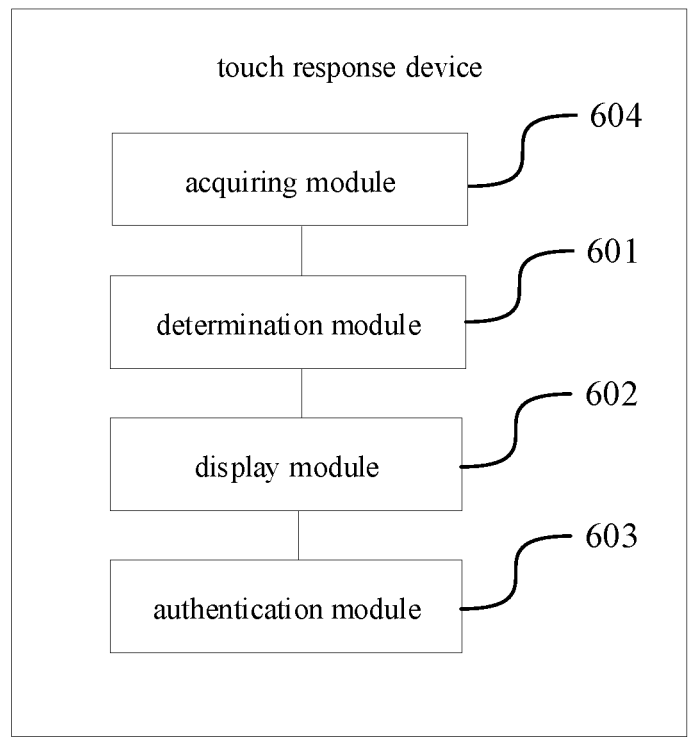
FIG. 7 is a block diagram of a touch response device according to an exemplary embodiment.

In a possible implementation, referring to FIG. 7, the device further includes:
  an acquiring module 604 configured to acquire fingerprint function information of the terminal, wherein the fingerprint function information is used to indicate whether the touch screen supports a fingerprint recognition function; and
  the determination module 601 configured to execute the step of determining the fingerprint recognition area when it is determined that the touch screen supports the fingerprint recognition function according to the fingerprint function information.

In a possible implementation, the acquiring module 604 is configured to:
  read a first system global variable, wherein a value of the first system global variable is used to indicate whether the touch screen supports the fingerprint recognition function;
  determine that the touch screen supports the fingerprint recognition function when the value of the first system global variable is a first target value; and
  determine that the touch screen does not support the fingerprint recognition function when the value of the first system global variable is a second target value.

In a possible implementation, the acquiring module 604 is configured to:
  call a first interface, wherein a return value of the first interface is used to indicate whether the touch screen supports the fingerprint recognition function;
  determine that the touch screen supports the fingerprint recognition function when the return value of the first interface is a first target value; and
  determine that the touch screen does not support the fingerprint recognition function when the return value of the first interface is a second target value In a possible implementation, the determination module 601 is configured to read a plurality of second system global variables to obtain coordinates of a plurality of vertices of the fingerprint recognition area, wherein the value of each second system global variable is used to indicate a horizontal coordinate and a vertical coordinate of one vertex.

In a possible implementation, the determination module 602 is configured to call a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

In the embodiment of the present disclosure, in the process of operating the application in the terminal, if the identity authentication is required, the terminal can determine whether it supports the fingerprint recognition function and a specific position of the fingerprint recognition area. Thus, when an identity authentication interface for implementing identity authentication is displayed, no interactive control is displayed in the fingerprint recognition area on the identity authentication interface. Therefore, the problem of an unintended response due to false triggering of the one or more interactive controls is avoided when a user performs a touch operation on the fingerprint recognition area to input the fingerprint.

With respect to the device of the above embodiment, the specific method of operation performed by each module has been described in details in the embodiment of the method, and the description thereof is described in details herein.

Figure 8:
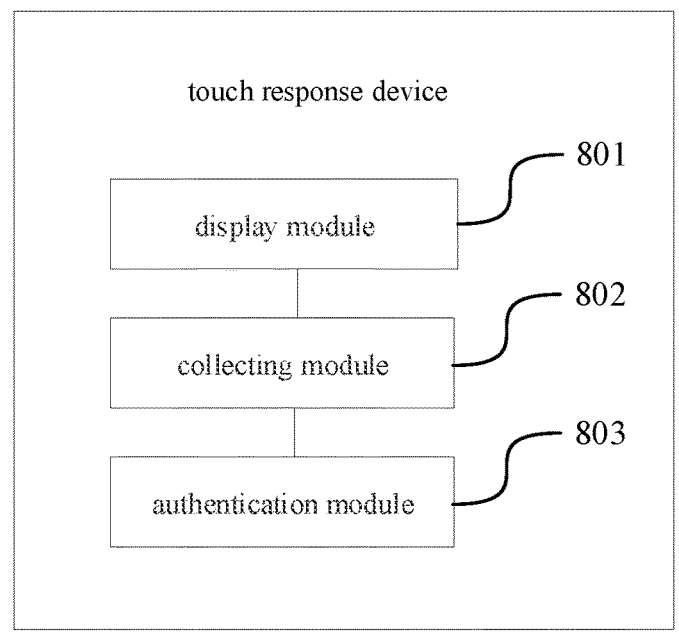
FIG. 8 is a block diagram of a touch response device according to an exemplary embodiment.

FIG. 8 is a block diagram of a touch response device according to an exemplary embodiment. Referring to FIG. 8, the device includes a display module 801, a collecting module 802 and an authentication module 803.

The display module 801 is configured to display an identity authentication interface of an application when identity authentication is required in the process of operating the application, wherein the identity authentication interface displays one or more interactive controls in the fingerprint recognition area of the touch screen.

The collecting module 802 is configured to only collect a fingerprint corresponding to a touch operation for the interactive control(s) when the touch operation is detected.

The authentication module 803 is configured to complete the identity authentication according to the fingerprint corresponding to the touch operation.

In a possible implementation, the collecting module 802 is configured to:
  intercept a touch event sent to the application by underlying software, and send a fingerprint collection instruction to a fingerprint module of the terminal at the same time, wherein the touch event is used to indicate that the touch operation for the one or more interactive controls is detected, and the fingerprint collection instruction is used to indicate that the fingerprint module begins to perform fingerprint collection; and
  collect, by the fingerprint module, a fingerprint corresponding to the touch operation.

In a possible implementation, the collecting module 802 is configured to collect the fingerprint corresponding to the touch operation only when it is detected that the touch operation for the one or more interactive controls is detected and a pressure value corresponding to the touch operation is greater than a preset threshold.

In the embodiment of the present disclosure, in the process of displaying, by the terminal, the identity authentication interface, if the touch operation for the one or more interactive controls on the identity authentication interface is detected, instead of a function corresponding to the interactive control, only a fingerprint collection function of the fingerprint recognition area is triggered. Therefore, the problem of an unintended response due to false triggering of the interactive control(s) when a user performs a touch operation in the fingerprint recognition area to input the fingerprint is avoided.

With respect to the device of the above embodiment, the specific method of operation performed by each module has been described in detail in the embodiment of the method, and as such will not be repeated here.

Figure 9:
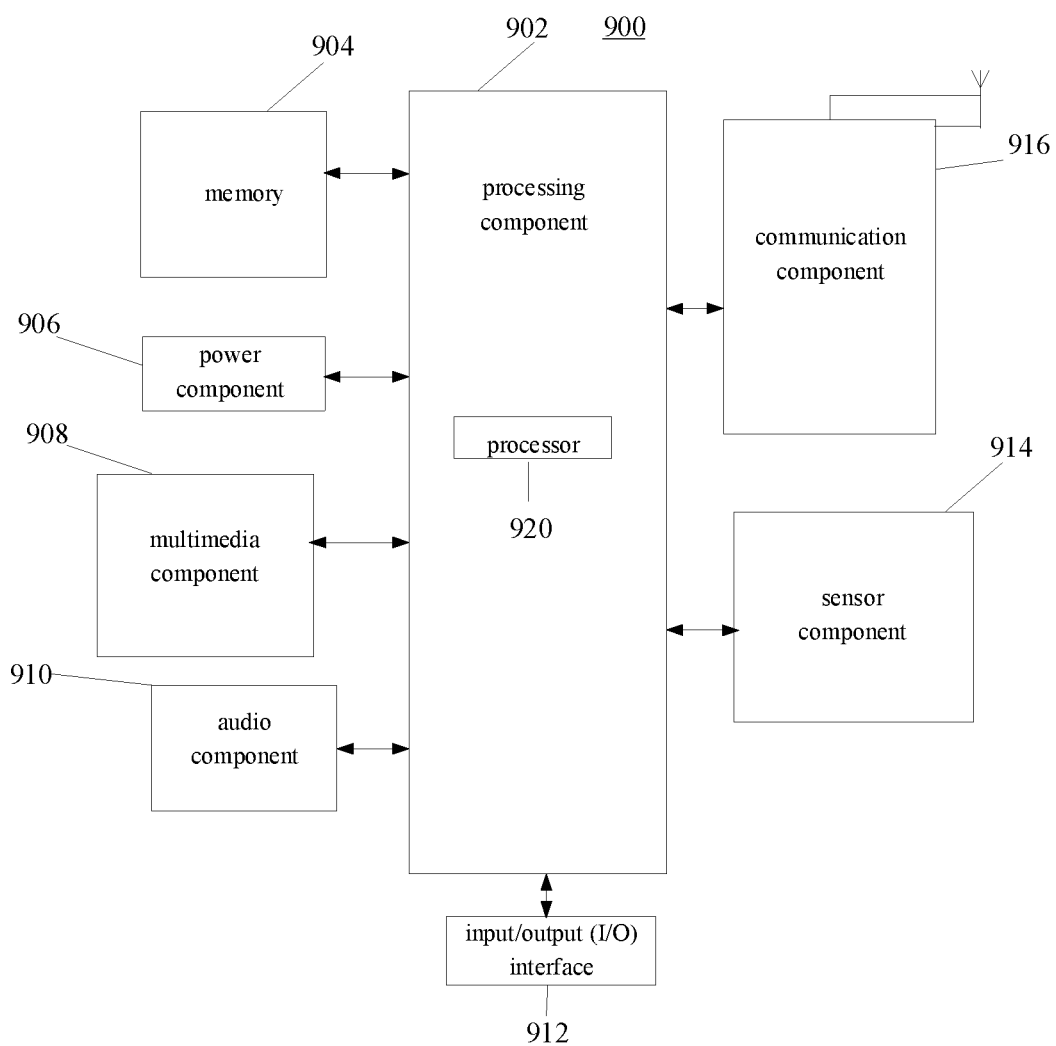
FIG. 9 is a block diagram of a touch response device according to an exemplary embodiment.

FIG. 9 is a block diagram of a touch response device 900 according to an exemplary embodiment. For example, the device 900 can be a mobile phone, a computer, a digital broadcast terminal, a messaging device, a gaming console, a tablet, a medical device, exercise equipment, a personal digital assistant, and the like.

Referring to FIG. 9, the device 900 can include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules which facilitate the interaction between the processing component 902 and other components. For instance, the processing component 902 can include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 804 can be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 can include a power management system, one or more power sources, and any other components associated with the generation, management, and distribution of power in the device 900.

The multimedia component 908 includes a screen providing an output interface between the device 900 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 908 includes a front camera and/or a rear camera. The front camera and the rear camera can receive an external multimedia datum while the device 900 is in an operation mode, such as a photographing mode or a video mode. Each of the front camera and the rear camera can be a fixed optical lens system or have focus and optical zoom capability.

In some embodiments, the display screen may be an organic light-emitting diode (OLED) display screen, an active-matrix organic light-emitting diode (AMOLED) display screen, or a micro organic light-emitting diode (micro OLED) display screen, etc.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal can be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons can include, but are not limited to, a home button, a volume button, a starting button, and a locking button.

The sensor component 914 includes one or more sensors to provide status assessments of various aspects of the device 900. For instance, the sensor component 914 can detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 can include a proximity sensor configured to detect the presence of nearby objects without any physical contact. The sensor component 914 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 900 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described touch response methods.

In some embodiments, there is also provided a non-transitory computer-readable storage medium including instructions, such as included in the memory 904, executable by the processor 920 in the device 900, for performing the above-described methods. For example, the non-transitory computer-readable storage medium can be a ROM, a RAM, a CD-ROM, a magnetic tape, a floppy disc, an optical data storage device, and the like.

In exemplary embodiments, there is also provided a computer-readable storage medium including computer programs, such as included in a memory, executable by a processor, for performing the above-described touch response methods. For example, the computer-readable storage medium can be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A touch response method applied to a terminal with a touch screen having a fingerprint recognition area, the method comprising:
    recognizing a request for identity authentication in a process of operating an application;
    determining a location of the fingerprint recognition area of the touch screen when identity authentication is required in the process of operating an application;
    displaying an identity authentication interface of the application according to the fingerprint recognition area, wherein the identity authentication interface does not display any interactive control in the fingerprint recognition area of the touch screen;
    receiving an input of a fingerprint from a user in the fingerprint recognition area; and
    completing the identity authentication according to the fingerprint corresponding to the touch operation when a touch operation on the fingerprint recognition area is detected.

2. The method according to claim 1, wherein the displaying the identity authentication interface of the application according to the fingerprint recognition area comprises:
    acquiring interface information of the identity authentication interface; and
    wherein the interface information comprises a first information set, displaying the identity authentication interface on the basis of a second information set in the interface information other than the first information set, wherein the first information set refers to information for displaying one or more interactive controls in the fingerprint recognition area.

3. The method according to claim 1, wherein the displaying the identity authentication interface of the application according to the fingerprint recognition area comprises:
    acquiring interface information of the identity authentication interface, wherein the interface information comprises a first information set and the first information set refers to information for displaying one or more interactive controls located in the fingerprint recognition area;
    acquiring third information according to the interface information, wherein the third information refers to information for displaying, on an area on the identity authentication interface other than the fingerprint recognition area, the one or more interactive controls originally located in the fingerprint recognition area; and
    displaying the identity authentication interface on the basis of the third information.

4. The method according to claim 3, wherein the acquiring the third information according to the interface information comprises:
    in the interface information, modifying dimension information and position information of the one or more interactive controls located in the fingerprint identification area and one or more target controls, wherein a distance between the one or more target controls and the one or more interactive controls located in the fingerprint recognition area is less than a preset threshold; and
    taking the modified interface information as the third information.

5. The method according to claim 1, prior to determining the fingerprint recognition area of the touch screen, further comprising:
    acquiring fingerprint function information of the terminal, wherein the fingerprint function information is used to indicate whether the touch screen supports a fingerprint recognition function; and
    executing the step of determining the fingerprint recognition area when it is determined that the touch screen supports the fingerprint recognition function according to the fingerprint function information.

6. The method according to claim 5, wherein the acquiring the fingerprint function information of the terminal comprises:
    reading a first system global variable, wherein a value of the first system global variable is used to indicate whether the touch screen supports the fingerprint recognition function;
    determining that the touch screen supports the fingerprint recognition function when the value of the first system global variable is a first target value; and
    determining that the touch screen does not support the fingerprint recognition function when the value of the first system global variable is a second target value.

7. The method according to claim 5, wherein the acquiring the fingerprint function information of the terminal comprises:
    calling a first interface, wherein a return value of the first interface is used to indicate whether the touch screen supports the fingerprint recognition function;

determining that the touch screen supports the fingerprint recognition function when the return value of the first interface is a first target value; and determining that the touch screen does not support the fingerprint recognition function when the return value of the first interface is a second target value.

8. The method according to claim 1, wherein the determining the fingerprint recognition area of the touch screen comprises:

reading a plurality of second system global variables to obtain coordinates of a plurality of vertices of the fingerprint recognition area, wherein the value of each second system global variable is used to indicate a horizontal coordinate and a vertical coordinate of one vertex.

9. The method according to claim 1, wherein the determining the fingerprint recognition area of the touch screen comprises:

calling a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

10. A touch response device configured to realize the method of claim 1, the device comprising:

a processor; and a memory for storing instructions executable by the processor;

a touchscreen having a fingerprint recognition area;

wherein the processor is configured to:

determine a request for identity authentication input from a user;

determine a fingerprint recognition area of the touch screen when identity authentication is required in the process of operating an application;

display an identity authentication interface of the application according to the fingerprint recognition area, wherein the identity authentication interface does not display any interactive control in the fingerprint recognition area of the touch screen;

receive a fingerprint corresponding to a touch operation by the user; and complete the identity authentication according to the fingerprint corresponding to the touch operation when a touch operation on the fingerprint recognition area is detected.

11. The touch response device according to claim 10, wherein the processor is further configured to:

acquire interface information of the identity authentication interface; and wherein the interface information comprises a first information set, and wherein the processor is configured to display the identity authentication interface on the basis of a second information set in the interface information other than the first information set, wherein the first information set refers to information for displaying one or more interactive controls in the fingerprint recognition area.

12. The touch response device according to claim 10, wherein the processor is further configured to:

acquire interface information of the identity authentication interface, wherein the interface information comprises a first information set and the first information set refers to information for displaying one or more interactive controls located in the fingerprint recognition area;

acquire third information according to the interface information, wherein the third information refers to information for displaying, on an area on the identity authentication interface other than the fingerprint recognition area, the one or more interactive controls originally located in the fingerprint recognition area; and display the identity authentication interface on the basis of the third information.

13. The touch response device according to claim 12, wherein the processor is further configured to:

modify dimension information and position information of the one or more interactive controls located in the fingerprint identification area and one or more target controls in the interface information, wherein a distance between the one or more target controls and the one or more interactive controls located in the fingerprint recognition area is less than a preset threshold; and take the modified interface information as the third information.

14. The touch response device according to claim 10, wherein the processor is further configured to:

acquire fingerprint function information of the terminal, wherein the fingerprint function information is used to indicate whether the touch screen supports a fingerprint recognition function; and execute the step of determining the fingerprint recognition area when it is determined that the touch screen supports the fingerprint recognition function according to the fingerprint function information.

15. The touch response device according to claim 14, wherein the processor is further configured to:

read a first system global variable, wherein a value of the first system global variable is used to indicate whether the touch screen supports the fingerprint recognition function;

determine that the touch screen supports the fingerprint recognition function when the value of the first system global variable is a first target value; and determine that the touch screen does not support the fingerprint recognition function when the value of the first system global variable is a second target value.

16. The touch response device according to claim 14, wherein the processor is further configured to:

call a first interface, wherein a return value of the first interface is used to indicate whether the touch screen supports the fingerprint recognition function;

determine that the touch screen supports the fingerprint recognition function when the return value of the first interface is a first target value; and determine that the touch screen does not support the fingerprint recognition function when the return value of the first interface is a second target value.

17. The touch response device according to claim 10, wherein the processor is further configured to:

read a plurality of second system global variables to obtain coordinates of a plurality of vertices of the fingerprint recognition area, wherein the value of each second system global variable is used to indicate a horizontal coordinate and a vertical coordinate of one vertex.

18. The touch response according to claim 10, wherein the processor is further configured to:

call a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

19. A smart device comprising:
a processor;
a touchscreen having a fingerprint recognition area, the touchscreen configured to have a display being driven by the processor;
a computer-readable storage medium being operatively connected to the processor, the non-transitory computer-readable medium having stored therein computer programs that, when executed by a processor, instruct the processor to perform the following steps:
determine a request for identity authentication input from a user;
determine a fingerprint recognition area of the touch screen when identity authentication is required in the process of operating an application;
display an identity authentication interface of the application according to the fingerprint recognition area, wherein the identity authentication interface does not display any interactive control in the fingerprint recognition area of the touch screen;
receive a fingerprint corresponding to a touch operation by the user; and
complete the identity authentication according to the fingerprint corresponding to the touch operation when a touch operation on the fingerprint recognition area is detected.

20. A touch response device, comprising:
a processor; and
memory for storing instructions executable by the processor;
a touchscreen having a fingerprint recognition area;
wherein the processor is configured to:
　determine a request for identity authentication input from a user;
　determine a fingerprint recognition area of the touch screen when identity authentication is required in the process of operating an application;
　display an identity authentication interface of the application according to the fingerprint recognition area, wherein the identity authentication interface does not display any interactive control in the fingerprint recognition area of the touch screen;
　receive a fingerprint corresponding to a touch operation by the user;
　complete the identity authentication according to the fingerprint corresponding to the touch operation when a touch operation on the fingerprint recognition area is detected;
　acquire interface information of the identity authentication interface;
　wherein the interface information comprises a first information set, and wherein the processor is configured to display the identity authentication interface on the basis of a second information set in the interface information other than the first information set, wherein the first information set refers to information for displaying one or more interactive controls in the fingerprint recognition area;
　acquire interface information of the identity authentication interface, wherein the interface information comprises a first information set and the first information set refers to information for displaying one or more interactive controls located in the fingerprint recognition area;
　acquire third information according to the interface information, wherein the third information refers to information for displaying, on an area on the identity authentication interface other than the fingerprint recognition area, the one or more interactive controls originally located in the fingerprint recognition area;
　display the identity authentication interface on the basis of the third information;
　modify dimension information and position information of the one or more interactive controls located in the fingerprint identification area and one or more target controls in the interface information, wherein a distance between the one or more target controls and the one or more interactive controls located in the fingerprint recognition area is less than a preset threshold;
　take the modified interface information as the third information;
　acquire fingerprint function information of the terminal, wherein the fingerprint function information is used to indicate whether the touch screen supports a fingerprint recognition function; a
　execute the step of determining the fingerprint recognition area when it is determined that the touch screen supports the fingerprint recognition function according to the fingerprint function information;
　read a first system global variable, wherein a value of the first system global variable is used to indicate whether the touch screen supports the fingerprint recognition function;
　determine that the touch screen supports the fingerprint recognition function when the value of the first system global variable is a first target value;
　determine that the touch screen does not support the fingerprint recognition function when the value of the first system global variable is a second target value;
　call a first interface, wherein a return value of the first interface is used to indicate whether the touch screen supports the fingerprint recognition function;
　determine that the touch screen supports the fingerprint recognition function when the return value of the first interface is a first target value;
　determine that the touch screen does not support the fingerprint recognition function when the return value of the first interface is a second target value;
　read a plurality of second system global variables to obtain coordinates of a plurality of vertices of the fingerprint recognition area, wherein the value of each second system global variable is used to indicate a horizontal coordinate and a vertical coordinate of one vertex; and
　call a second interface to obtain the coordinates to the plurality of vertices of the fingerprint recognition area, wherein a return value of the second interface is used to indicate the horizontal coordinates and the vertical coordinates of the plurality of vertices in the fingerprint recognition area.

* * * * *